United States Patent
Schöler et al.

(10) Patent No.: US 8,291,264 B2
(45) Date of Patent: Oct. 16, 2012

(54) METHOD AND SYSTEM FOR FAILURE PREDICTION WITH AN AGENT

(75) Inventors: Thorsten Schöler, Kaufbeuren (DE); Werner Zirkel, Burgebrach (DE)

(73) Assignee: Siemens Aktiengesellschaft, Munich (DE)

( * ) Notice: Subject to any disclaimer, the term of this patent is extended or adjusted under 35 U.S.C. 154(b) by 11 days.

(21) Appl. No.: 12/847,817

(22) Filed: Jul. 30, 2010

(65) Prior Publication Data
US 2011/0029824 A1 Feb. 3, 2011

(30) Foreign Application Priority Data
Aug. 3, 2009 (DE) .................. 10 2009 035 949

(51) Int. Cl.
*G06F 11/00* (2006.01)

(52) U.S. Cl. ............. 714/26; 714/37; 714/47.1; 714/48; 714/57

(58) Field of Classification Search .................... 714/26, 714/37, 47.1, 48, 57
See application file for complete search history.

(56) References Cited

U.S. PATENT DOCUMENTS

| | | | |
|---|---|---|---|
| 5,951,611 A * | 9/1999 | La Pierre | 701/29 |
| 7,308,385 B2 * | 12/2007 | Wegerich et al. | 702/183 |
| 7,496,798 B2 * | 2/2009 | Link et al. | 714/47.2 |
| 8,001,423 B2 * | 8/2011 | Spier et al. | 714/26 |
| 2002/0036850 A1 * | 3/2002 | Lenny et al. | 360/31 |
| 2005/0210337 A1 * | 9/2005 | Chester et al. | 714/47 |
| 2005/0289380 A1 * | 12/2005 | Davis et al. | 714/1 |
| 2008/0250265 A1 * | 10/2008 | Chang et al. | 714/4 |

* cited by examiner

*Primary Examiner* — Charles Ehne
(74) *Attorney, Agent, or Firm* — Lempia Summerfield Katz LLC

(57) ABSTRACT

A system, a computer program product and a method for failure prediction are implemented on an agent. The agent is installed on a machine to be monitored. The method includes detecting service data on the machine. A reference database is accessed, and a failure pattern is provided. The detected service data are analyzed in view of the provided failure pattern by applying a correlation mechanism, such that a prediction for future failures is generated and depicted as a result.

19 Claims, 3 Drawing Sheets

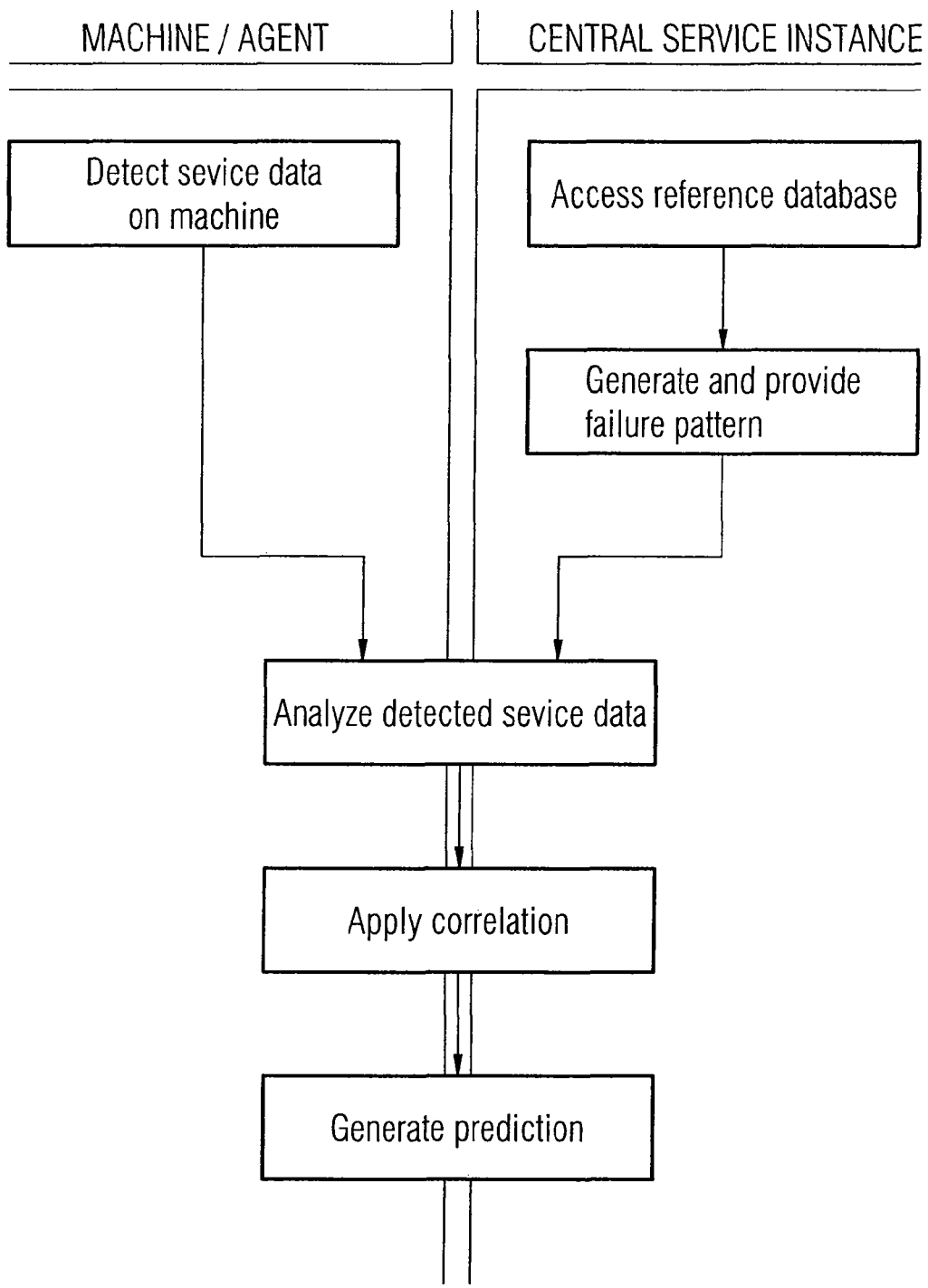

US 8,291,264 B2

METHOD AND SYSTEM FOR FAILURE PREDICTION WITH AN AGENT

This application claims the benefit of DE 10 2009 035 949.4 filed Aug. 3, 2009, which is hereby incorporated by reference.

BACKGROUND

The present embodiments relate to automatic prediction of failures in a distributed system comprising a plurality of complex machines.

Complex technical apparatuses and systems (e.g., imaging systems in radiology or other medical domains) are monitored with respect to possible failures, deficiencies, breakdowns or malfunctions. These medical systems are usually monitored in the context of an event management process, which generally aims at detecting failures as early as possible in order to avoid future failures. Normally, well-defined events (e.g., failure notifications) will be sent to a service operator and will be analyzed by the same.

However, operators are often overwhelmed by their tasks to recover the system failure under time pressure. Therefore, it is necessary to detect failures as soon as and as definite as possible and to avoid wrong or incomplete failure notifications.

In state of the art systems, failure patterns for a specific, particular device are detected. Known service management systems such as, for example, "HP OpenView" and "ECS Designer" include functionalities in order to detect complex failure states. These systems typically use different statistical approaches, like regression and/or classification procedures or specific data mining procedures (e.g., expectation maximization, survival analysis for the prediction of failures). However, these systems mainly refer to offline-analysis-systems or to systems, which are operated separately and are not integrated in the context of an existing IT-architecture for the respective machines to be monitored.

SUMMARY AND DESCRIPTION

Therefore, there is a need for a system, a method and a computer program product for failure prediction on an on-line basis in order to predict failures before the failure occurs and in order to take preventive actions for the systems as a whole. Further, the failure prediction system should be as simple as possible but in parallel applicable to a plurality of different kinds of technical fields and machines. Moreover, there is a need to combine existing IT-infrastructure with failure prediction. Particularly, failure prediction (as an extension) should be integrated into or be part of an existing monitoring platform.

The present embodiments focus on a computer-based system, a computer program product and a computer-implemented method for failure prediction, implemented as an agent. The agent may be installed on one machine (which results in a bidirectional relation between agent and machine). However, an agent that is responsible for a plurality of machines and serves the plurality of machines in the context of failure prevention may be provided. According to another embodiment, at least one central agent that is responsible for a plurality of machines with complex technical sub-modules (e.g., a scanner or a detector in a distributed client-server architecture) may be provided. The agent may be stored as instructions for operating or configuring a programmed computer or processor. The agent is stored in non-transitory volatile or non volatile memory.

In order to monitor or inspect the respective machine with respect to failures and failure prediction, the method includes detecting service data on the machine, where the service data includes sensor data and nominal/time-based event data, and the service data refer to all relevant or selected sub-modules of the machine. The method also includes accessing a reference database, in which reference service data relating to previously detected failures and maintenance related events are stored. The method further includes providing at least one failure pattern, analyzing the detected service data in view of the at least one failure pattern by applying a correlation mechanism and generating a prediction for future failures as a result of the method according to the present embodiments.

The failure prediction according to the present embodiments refers to a failure forecast so that any failure, malfunction or breakdown, for example, of the machine is indicated or predicted before the failure occurs. One embodiment may refer to predictive failure or service management. Another embodiment refers to the failure being indicated before the failure is perceived by the operator. According to another embodiment, the method may also be used for proactive failure management. The present embodiments refer to all kinds of failures such as, for example, deficiencies in at least one element, module or sub-module of the machine, breakdowns, and malfunctions of the connecting network system or of the underlying electricity.

In one embodiment, the agent is a software module that is installed on the respective machine to be monitored. However, in other embodiments, the software module may also be installed on any other computer associated with the machine to be monitored. According to another embodiment, the agent may be a hardware implementation such as, for example, a microprocessor with the functionality mentioned above in connection with the method according to the present embodiments.

The term "service data" may be data that is relevant for correct operation of the machine. "Service data" may include all relevant technical failure-related data. Two categories of service data exist:

1. Sensor data, which are detected by sensors attached on the machines—The sensor data include temperature related data, voltage or speed related values, material defects and computer processing data such as, for example, resource related data, data relating to memory capacity or processing power or data relating to data transfer.

2. Nominal event data—The nominal event data include reference events related to the operation of the respective machine using message identificators and/or message notifications generated by sub-components or sub-modules such as, for example, embedded hardware controllers, workstations or robotic devices.

The service data are time-based, so that any detected event or sensor value is associated with a respective point of time. The point of time refers to the occurrence of the event or the detection of the sensor data.

The reference database may be a relational database for storing reference service data relating to previously detected failures and maintenance related events. In one embodiment, relevant context data for servicing the respective machine are additionally stored in the database. The database may be a central database that is in data exchange with all agents. According to another embodiment, the central reference database may only be in data exchange with a central unit that is configured to be responsible for failure prediction and serves the respective clients or agents.

The "correlation mechanism" may be an event correlation procedure and is based on the information technological concept that any event relating to the operation of the machine is to be regarded in the context of the preceding and successive events of the machine. Therefore, a correlation consists of a set of events that have a certain structure. This reproducible sequence forms a pattern. With these patterns, failure situations may be identified. The present embodiments may be used to identify failure situations that occur repeatedly and are therefore predictable by analyzing historical (previously detected) data. The present embodiments are based on the modeling of the rearward experience that certain events are very frequent just before the failure occurs and that the certain events are measurable in a weaker unit as predictive indicators.

Based on historical maintenance data and the detected service data, the respective parameters are compared for identifying a correlation of those parameters, values of parameters or sets of parameters that have previously been identified in a failure situation. In other words, the failure situation is identified as being causally determined by these events.

After having identified the correlations, a prediction for future failures may be generated and displayed on a monitor. Alternatively, the result may be outputted in another format (e.g., in acoustic form or by using an alert signal).

According to one embodiment, the result also includes a probability data structure. The probability data structure includes probability data with respect to the forecasting or the generated prediction. According to this aspect, a service operator or field engineer may be informed about the probability of the generated failure prediction. There may be defined rules and parameters, according to which it is configurable when to activate any appropriate counter-measure. The present embodiments may include medical apparatuses and systems such as, for example, imaging systems such as computer tomographs, nuclear magnetic resonance apparatuses, ultrasonic devices, positron emission tomography devices or any other medical systems. These medical apparatuses and systems are complex systems and consist of a plurality of sub-modules, which are to operate correctly in order to avoid any failures of the system as a whole. The interrelation of these sub-modules is taken into account by accessing system failure of the overall system (e.g., the machine). This interrelation is to be taken into account. Thus, the failure pattern may include a set of patterns that refer to different sub-modules. The events may additionally refer to other machines or to other technical devices that are used for the correct operation of the machine as a whole (e.g., network devices, authorizing and authentication devices). The parameters and information representing the operation of the sub-modules or sub-components is aggregated in the respective failure pattern.

The present embodiments may be divided into two time phases:

1. A training phase—The training phase is adapted to acquire and detect training data that are to be examined prior to building a pattern. The training data may be based on a set of log files from different sites, different machines or different sub-modules of the same machine to be monitored. Data relating to the service management of the machine may be stored in log files to be examined later. In this training phase, a raw pattern may be generated, and the raw pattern may be used for generating a detailed pattern, in which dependencies between the respective events may be identified and weighted according to pre-configurable semantic measures.

2. A prediction phase—The prediction phase is used for generating a failure prediction by using the generated failure pattern (e.g., generated in the training phase) for event correlation. The service data may be detected in the prediction phase in order to make sure that the detected service data are as actual as possible. However, according to another embodiment, the prediction for a certain time period may be executed. For example, specific medical device failures may occur during night time when most of the apparatus and devices are partially in idle mode or are utilized to capacity. In this phase, the correlation may be executed for night time or another specific time period and not for the another time.

According to another aspect of the present embodiments, two categories of patterns exist:

1. Raw patterns; and
2. Detailed patterns, where the detailed patterns are built upon and are based on raw patterns.

Raw Patterns—Feature selection is carried out by generating a raw pattern. The raw pattern is an unstructured set of events that may be associated with the specific failure situation. Statistical procedures such as, for example, frequency distributions may be applied to identify the raw pattern. To enlarge the sample set, significance tests may be executed. In one embodiment, these procedures may be executed only for a specific time period.

Detailed Patterns—Event sequences may be identified by either using expert knowledge and/or by applying a time-based association algorithm (e.g., generalized sequential patterns (GSP)). A detailed pattern may also use statistical functions on sensor values. The classification thresholds may be identified by using a regression method.

To prove a detailed pattern's efficiency, additional significance tests are performed.

Detailed patterns consist of events, event sequences and/or sensor or other input values. The detailed patterns are organized in a hierarchical structure of sub-patterns to minimize the CPU load of the agent. Each structural element may use a threshold definition.

According to another embodiment, the correlation is based on continuously retrieved metrics that may be used as a basis for a machine-specific problem classification.

In one embodiment, the agent, which is configured to execute the prediction method, may perform data mining classification methods. Further, the agent may be configured to perform time-series prediction methods such as, for example, sliding window procedures and other more complex models (e.g., procedures for analyzing time series such as—autoregressive integrated moving average (ARIMA)).

The machine includes a medical, technical device such as, for example, a complex imaging device that consists of several sub-modules. Other embodiments include other technical devices, for example, in other technical areas (e.g., hardware development, chip design and automotive systems). Therefore, the agent is configured for the respective application. In one embodiment, this customer process alignment is executed automatically (e.g., without any user interaction). The alignment may be based on the log file of the machine. In other embodiments, methods and procedures for autonomous behavior of the agent, focusing on general software performance characteristics and/or on self-adjustment to customer's processes (e.g., machine alignment), are provided.

According to another aspect of the present embodiments, a notification unit that is configured to generate a notification (e.g., an acoustic message, a textual message or an alert signal), send the notification to the machine, a service unit or another device and inform about imminent failure. Upon receiving the notification, counter-measures may be initiated automatically or upon receiving a confirmation signal.

The machine may include a plurality of sub-modules that interact with each other. Thus, the failure pattern includes events of all or selected sub-modules and the interaction between the sub-modules.

In one embodiment, the failure prediction is based on the failure pattern that takes into account context data for the specific failure situation. Context data may be the context of a possible failure situation such as, for example, medical workflow, a specific group of events, the materials used, the kind of examinations. The correlation mechanism is based on a rule-based and/or knowledge-based system. The rule-based system is configured to process association models derived from data mining classification algorithms such as, for example, decision tree algorithms, rule-based algorithms (e.g., of the a-priori-family), time-based algorithms (e.g., generalized sequential pattern algorithms (GSP) and time-series models (e.g., ARIMA)).

Generated failure pattern may be generated for different time frames or time periods. Failure patterns may be generated using the sliding window approach.

In one embodiment, a system for failure prediction with an agent, where the agent is installed on at least one machine to be monitored, and the agent is configured to execute the methods described above.

The system may include a detection unit, a reference database and a processing unit. Additionally, the system may include a central service unit for executing the failure prediction method.

According to a further embodiment, the central service unit may provide decision support functions, based on the agent data. The system supports consecutive actions triggered by an alert from the agent.

In one embodiment, a computer program product is provided.

Further embodiments of the system and the computer program product may include the features that have been mentioned with respect to the description of the embodiments of the method above. The features according to the method may be implemented in modules of a hardware structure with the respective functionality or of a microprocessor chip that is configured to execute the functionality described.

BRIEF DESCRIPTION OF THE DRAWINGS

FIG. 3 is a flowchart illustrating one embodiment of a method for failure prediction.

DETAILED DESCRIPTION OF THE DRAWINGS

Figure 1:
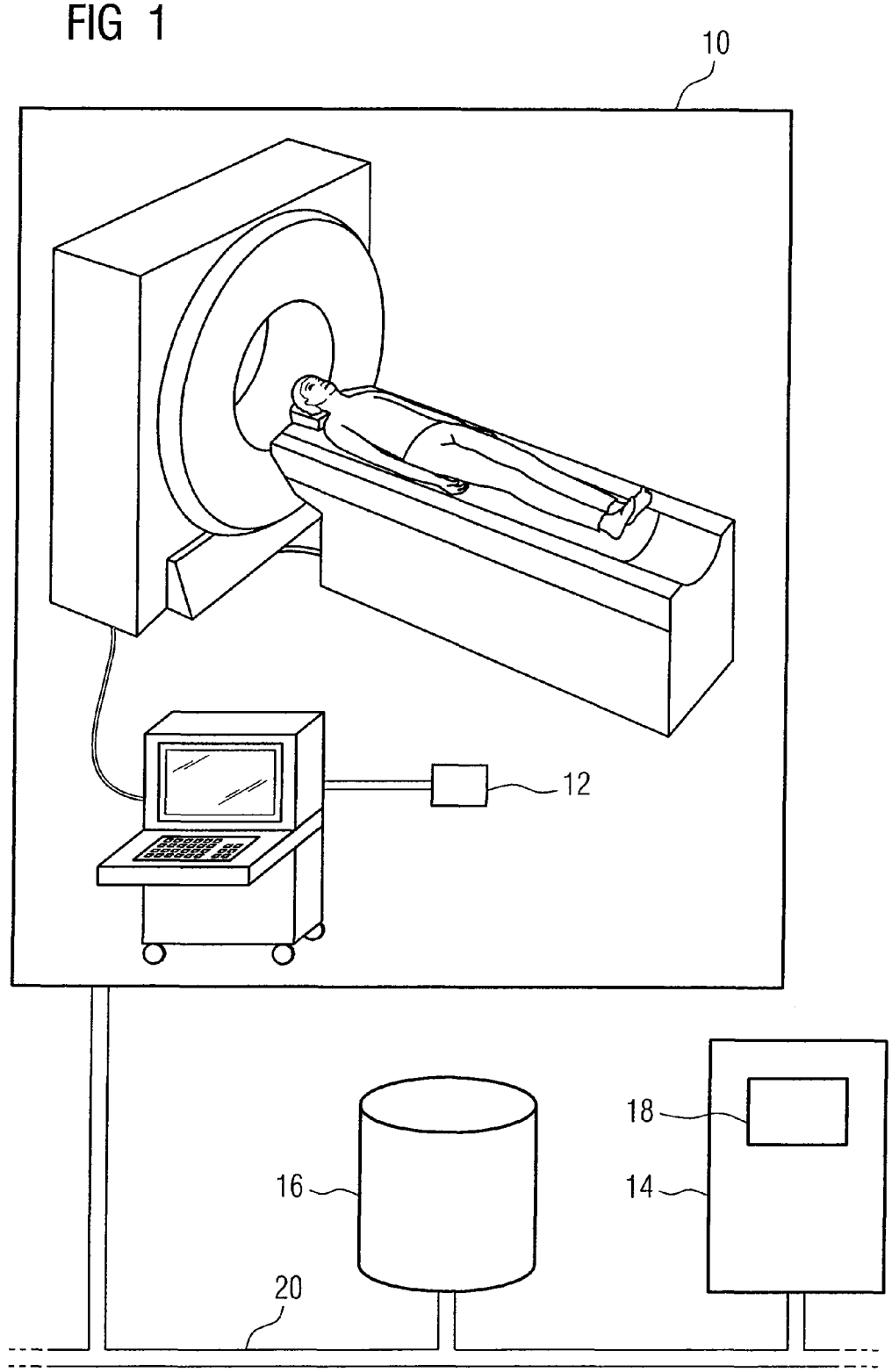
FIG. 1 illustrates one embodiment of a medical machine.

FIG. 1 illustrates one embodiment of a machine 10.

The machine 10 may be a complex medical apparatus such as, for example, a computer tomograph, a nuclear magnetic resonance scanner or other medical apparatuses in the field of radiology or medical imaging. The present embodiments may also be applied to other fields of technology, such that the machine 10 may also be a machine for product engineering, a machine within a production cycle or a device used for hardware engineering (e.g., chip design), for example. The machine 10 includes a plurality of sub-entities or sub-modules that interact with each other in order to provide the functionality of the machine. In one embodiment, the machine 10 includes a scanner, a monitor, a computer with the processing unit, and other hardware devices with respective sub-modules. An agent 12 is installed on the machine 10 or on a computer that is associated with the machine 10 (e.g., including respective devices for data transmission). This is shown in FIG. 1 by the arrow starting from the rectangle "12" and ending at the computer of the machine 10.

In one embodiment, the system further includes a central service unit 14 that includes a central processing unit 18. The system also includes a reference database 16 that is shown in the middle of FIG. 1. Components of the system such as, for example, the machine 10, the central service unit 14 and the reference database 16 interact with each other using a data communication network (e.g., a bus system 20). In one embodiment, direct data connections between the respective components (e.g., between the agent 12, the computer of the machine 10, the reference database 16 and the central service unit 14) may be used.

The agent 12 is configured to perform a computer-implemented method for failure prediction with respect to the machine 10. The central service unit 14 may monitor a plurality of machines 10. Accordingly, a plurality of agents 12 are installed on the plurality of machines 10. In one embodiment only one agent 12 is installed to serve a set of machines 10. In a further embodiment, only one agent is installed on a central unit serving all machines 10, where the central agent is operable to separate the data coming from the different machines, so that an identifying relation (e.g., which data belongs to which machine) is possible.

FIG. 3 shows a flowchart of one embodiment of a method for failure prediction.

In FIG. 3, method acts that may be executed on the machine/agent-side are shown on the left-hand side, whereas method acts that may be executed on the central (server) unit-side are shown on the right-hand side. In other embodiments, other structuring and association of the method acts with respect to the units to be executed on may be used.

In one embodiment, service data are detected on the machine 10. This may be done by the agent 10 on the machine side (e.g., the left-hand side in FIG. 3). The service data include sensor data such as, for example, temperature, voltage or any other physical values related to the operation of the machine 10 or to any material used for operating the machine 10. Other service data relate to computer processing of the data such as, for example, technical resources (e.g., memory capacity, processing power, and data transfer transmission rate). The service data may also relate to nominal and/or time-based event data. In other words, the service data may also be associated to any events that are relevant to the operation of the machine 10. This event data are may be time-based, so a date or a point of time may be associated with the respective event. The detection of time-based event data is done by using message identificators and/or message notifications or texts, which are generated by the sub-modules of the machine 10. The sub-modules of the machine 10 may be embedded hardware controllers, robotic devices, or any other hardware module, software module or related workstations.

Referring again to FIG. 3, the method is based on an analysis of previously collected historical data that relate to the operation of the machine 10. This may be done by accessing the reference database 16, in which reference service data relating to historical detected failures and maintenance related events are stored. This is shown in the upper right-hand side of FIG. 3.

After accessing the reference database 16, a failure pattern for the machine 10 to be monitored is generated and provided.

The accessing and the providing of the failure pattern may be executed in a training phase, where additional acts (e.g., analyzing the detected service data and generating a prediction for future failures) are executed in a second, prediction phase. These two phases may be executed independently of each other, such that acts of the prediction phase may be executed during, after or before the training phase, provided there are already enough training data collected to perform the correlation mechanism. Otherwise, a simple comparison may be executed between actual detected machine-related data and reference data (e.g., nominal operating data for the machine).

The training phase and the prediction phase may overlap, such that accessing the reference data base and providing the failure pattern may be executed in parallel to the detection of service data on the respective machine 10. The phase overlap may help to reduce performing time.

After having detected the relevant service data on the machine 10, and after having provided the failure pattern, the detected service data are analyzed in view of the at least one failure pattern by applying a correlation mechanism.

The correlation mechanism is based on a rule-based and/or knowledge-based system, where the correlation mechanism is able to process association models derived from data mining classification algorithms such as, for example, decision tree algorithms, rule-based algorithms (e.g., of the a-priori-family) and/or time-based algorithms (e.g., the Generalized Sequential Patterns (GSP) algorithm or time-series models such as, for example, autoregressive integrated moving average (ARIMA)). In one embodiment, the correlation mechanism is based on statistical procedures and/or data mining procedures. The data mining procedures may include, for example, frequency distributions, significance tests and other statistical algorithms. In one embodiment, algorithms relating to the field of pattern matching may be used.

The acts of analyzing, applying correlation mechanisms and generating the prediction are shown in the middle of FIG. 3. This orientation represents the fact that these acts may be carried out on the agent 10 or may be executed on the central service unit 14.

In one embodiment, the acts within the training phase may be executed on the agent. In this case, there is no need to provide a separate central service unit 14.

The prediction for future failures is provided as a result of the method and may be displayed on a monitor or forwarded to a user or administrator of the system. The failure prediction includes information with respect to a future failed state (e.g., in which component of the machine 10 a failure will occur, at what time/when the failure will occur, possible reasons for the failure and y possible counter-measure actions that may be taken to avoid the failure). In one embodiment, the result may include statistical information relating to a probability of the occurrence of the failure.

Figure 2:
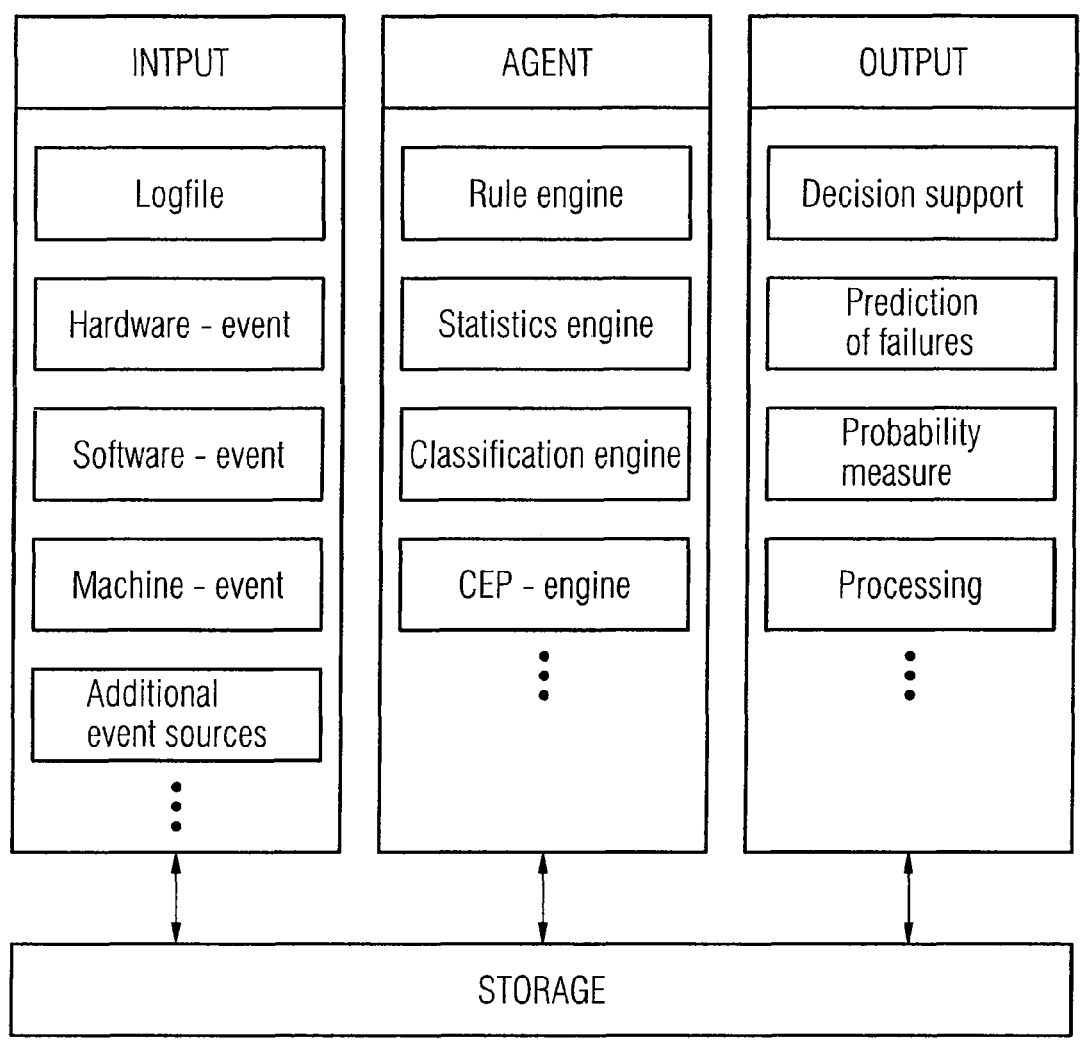
FIG. 2 illustrates a diagram of input and output parameters of an agent.

With the aid of FIG. 2, the input and output parameters are described in more detail in order to describe the failure prediction method according to one embodiment. The input parameters may include: log files of historical maintenance events and monitoring events or log files regarding previously detected failures; hardware events; software events; machine-related events; or additional event sources that may relate to associated sub-modules of the machine 10 or to other associated external modules.

The input parameters are processed by the agent on the machine 10. This is done using a rule engine of a statistic engine, a classification engine and a Complex Event Processing (CEP)-engine. Any other algorithms may be used for processing the input parameters in order to derive a failure prediction of sub-modules of the machine 10.

On the right-hand side in FIG. 2, the output parameters are shown. The output parameters may include: decision support for a maintenance of the machine 10; a prediction of failures (each result includes information with respect to the sub-module of the machine, where the failure may occur); and/or probability measures and/or results of other processing devices. For example, the output may be forwarded to a decision support module. The decision support module may trigger consecutive actions with regard to the predicted failure and may be associated to an alert (e.g., at the side of the agent).

According to another embodiment, the result also includes features for providing an autonomous behavior of the agent. The term "autonomous behavior" is to be interpreted in the sense of automatically triggering actions and measures in order to avoid the predicted failure at the machine 10. The autonomous behavior relates to an adjustment of the actual system parameters such as, for example, general software or hardware performance characteristics. The autonomous behavior also relates to a self-adjustment to needs and requirements of the client or customer, processes of the client, customer, or the specific application, application or use of the machine 10 (e.g., within a specific medical workflow).

The generated and provided failure patterns relate to failure-related events. The failure-related events may be structured into semantic blocks with dependencies between events. Additionally, elements of the failure pattern may be weighted for adjustment of the respective pattern for a dedicated use case.

In one embodiment, the events within the failure pattern are structured. The events within the failure pattern may be structured according to time-periods or to pre-configurable time-intervals.

In another embodiment, the result with the failure pattern and the generated prediction is displayed on a display device that is associated with the machine 10 or the central service unit. The amount of displaying may be configured, for example, to select specific time frames and data to be displayed. For example, data after Jun. 1, 2010 and before Jun. 5, 2010 may be selected. The selected time-period may be displayed as a window width, which may be highlighted during displaying. Within the chosen window width, the failure patterns are displayed in more detail and may be processed by further statistical algorithms.

In one embodiment, only the service data that are derived from the respective machine 10 are used for failure prediction of the machine 10. This embodiment relates to an intra-machine failure prediction.

In another embodiment, the service data to be used for generating the prediction may be extended. Other service data, stemming from other agents or machines (e.g., within the network), are analyzed and used for generating the prediction. This embodiment is useful if service data of machine A have to be compared to reference service data of another machine B (e.g., only differing in that a software update has been implemented).

The comparison or correlation may be executed relative to a specific kind of machine, a different kind of machine or different machines in different fields. Thus, the same failure prediction method may be used without further adaption, for example, for CT scanners, NMR scanners, train maintenance systems, automotive systems, wind energy converters, chip engineering or any other technical application. Due to the self-alignment of the present embodiments, it is not necessary to adapt the process to the specific kind of machine; therefore, the process may be used for a number of different systems and machines in different fields. The prediction is based on historical machine-specific data and a specific time function (e.g., a sliding windows approach).

In one embodiment, the functionality of the agent may be extended or additional agents may be provided, for example, for comparing the failure pattern with threshold values, which may be pre-configured, for pattern management and/or for communication with a service management system. Additionally, agents may be provided for performance monitoring of the agent or for performance monitoring of the machine (e.g., CPU monitoring and/or memory monitoring). Further agents may relate to the management of the agents to be installed on the respective machines 10. The management of the agents may include starting, stopping and manually amending the functionality of the agent.

An advantage of the present embodiments is that the failure prediction may be integrated in the existing information-technology architecture. It is not necessary to install an additional separate system. To the contrary, the functionality of the present IT-system may be extended by providing an agent on the client side.

Another advantage is that the machines 10 may provide an autonomous functionality with respect to failure management.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A computer-implemented method for failure prediction, implemented as an agent, wherein the agent is installed on a machine to be monitored, the computer-implemented method comprising:
   detecting service data on the machine;
   accessing a reference database, in which reference service data relating to previously detected failures and maintenance related events are stored;
   providing a failure pattern;
   analyzing the detected service data in view of the failure pattern, the analyzing comprising applying a correlation mechanism;
   generating a prediction for future failures as a result of the analyzed detected service data; and
   automatically triggering measures to avoid the predicted future failures,
   wherein automatically triggering measures comprises automatically adjusting parameters of the machine to be monitored.

2. The method of claim 1, further comprising generating a notification informing about a future failure and sending the notification to the machine, a service unit or to another device.

3. The method of claim 1, wherein the machine comprises a plurality of sub-modules, the plurality of sub-modules interacting with each other, and wherein the failure pattern comprises events of all or selected sub-modules and the interactions between all or the selected sub-modules.

4. The method of claim 1, wherein the failure pattern is generated by taking into account machine-related parameters and events and prior failure-related, statistical data.

5. The method of claim 1, wherein the failure pattern is generated by taking into account different time phases, during which previously detected failures and events have occurred and during which machine-related service data are detected or have occurred.

6. The method of claim 1, wherein the detected service data comprise context data with respect to the machine or an actual functionality or a present application of the machine.

7. The method of claim 1, wherein the detected service data comprise:
   sensor data including temperature, voltage or speed values or material defects;
   computer processing data including resources, memory capacity, processing power or data transfer; and
   nominal, time-based event data, generated by sub-modules of the machine, the sub-modules including embedded hardware controllers or robotic devices.

8. The method of claim 1, wherein the correlation mechanism uses a threshold for machine-related parameters or service data, and
   wherein the threshold represents a limit for correct operation of the machine.

9. The method of claim 1, wherein the correlation mechanism is based on a rule-based or knowledge-based system, and
   wherein the rule-based system is operable to process association models derived from data mining classification algorithms, the data mining classification algorithms including decision tree algorithms, rule-based algorithms, time-based algorithms, or time-series models.

10. The method of claim 1, wherein the correlation mechanism uses statistical or data mining procedures, and
    wherein the statistical procedures comprise analysis of frequency distributions, significance tests and a generalized sequential pattern algorithm.

11. The method of claim 1, wherein the generated prediction for future failures is generated for different time frames using a sliding windows approach.

12. The method of claim 1, wherein the machine is a medical apparatus.

13. The method of claim 1, wherein the result is used to pre-plan upcoming service actions with respect to the machine.

14. The method of claim 1, further comprising providing procedures for autonomous behavior of the agent, taking into account performance characteristics and self-adjustment to client applications on the machine or to the machine.

15. The method of claim 1, wherein the method is used for different machines.

16. A system for failure prediction with an agent, wherein the agent is installed on a machine to be monitored, the system comprising:
    a detection unit for detecting service data on the machine;
    a reference database, in which reference service data relating to previously detected failures and maintenance related events are stored;
    a processing unit configured for:
       providing a failure pattern;
       analyzing the detected service data in view of the failure pattern as a function of correlation; and
       generating a prediction for future failures as a result of the analyzed detected service data, the generated prediction for future failures being generated for different time frames using a sliding windows approach; and
    a central service unit for failure prediction, the central service unit being in data exchange with a plurality of agents for a plurality of different machines, such that a plurality of failure patterns corresponding to the plurality of different machines is provided, the plurality of agents comprising the agent, the plurality of different machines comprising the machine, the plurality of failure patterns comprising the failure pattern.

17. The system of claim 16, wherein the system or the processing unit is configured to provide decision support functions and support consecutive actions triggered by an agent alert, based on the data of the agent.

18. A non-transitory computer program product for failure prediction, implemented on an agent, wherein the agent is installed on a machine to be monitored, wherein the computer program product comprises a computer-readable storage medium having computer-readable program code portions stored therein, the computer-readable program code portions comprising:

detecting service data on the machine;

accessing a reference database, in which reference service data relating to previously detected failures and maintenance related events are stored;

providing at least one failure pattern;

applying a correlation mechanism to the detected service data with the failure pattern; and generating a prediction for future failures as a result of the correlation mechanism being applied to the detected service data, the prediction for future failures comprising statistical information relating to a probability of the occurrence of the future failures, wherein the generated prediction for future failures is generated for different time frames using a sliding windows approach.

19. The system of claim 16, wherein the central service unit comprises the processing unit.

* * * * *